Feb. 8, 1927.
L. B. GROESCHEL
1,617,304
FILM MOUNT
Filed April 7, 1926
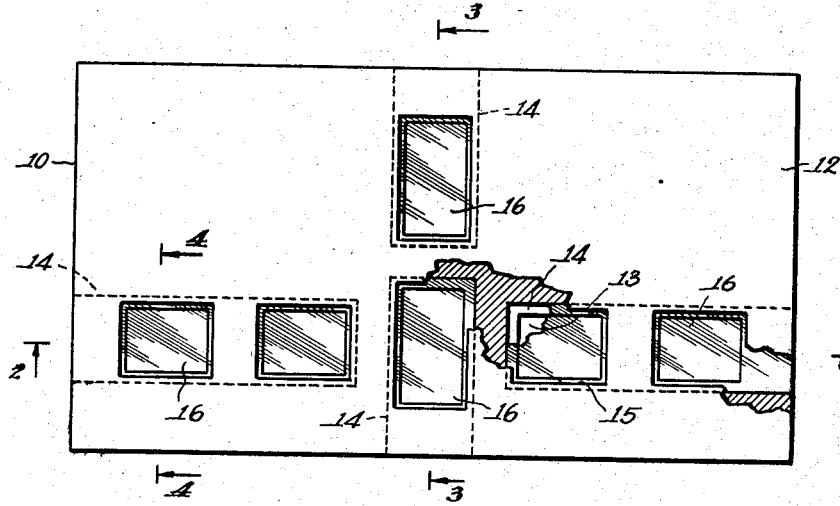
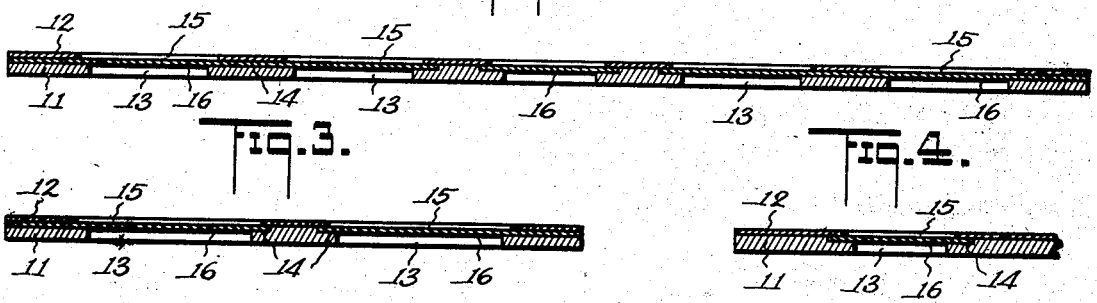
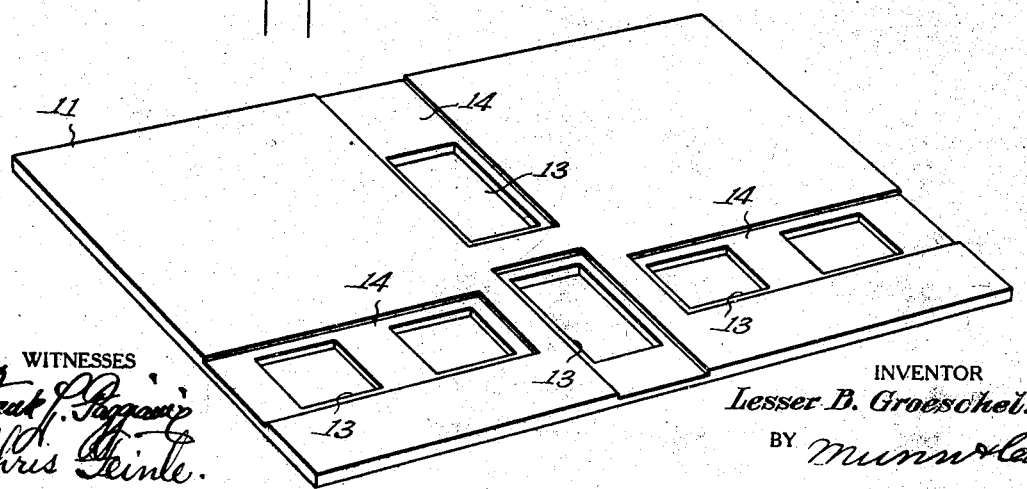
WITNESSES
INVENTOR
Lesser B. Groeschel.
BY
ATTORNEYS.

Patented Feb. 8, 1927.

1,617,304

UNITED STATES PATENT OFFICE.

LESSER B. GROESCHEL, OF MOUNT VERNON, NEW YORK.

FILM MOUNT.

Application filed April 7, 1926. Serial No. 100,417.

This invention relates to film mounts or film holders, and relates particularly to the class of mounts or holders for receiving and displaying X-ray negative films taken by dentists.

Some of the objects of the invention in connection with film mounts or holders are: to facilitate the mounting of the film; to provide a simplified construction, and to reduce manufacturing costs to the minimum.

The nature of the invention and its distinguishing features and advantages will appear when the following specification is read in connection with the accompanying drawings, in which—

Figure 1 is a side view with portions being broken away to show certain features of construction of the film mount of the present invention.

Figs. 2, 3 and 4 are sectional views taken respectively on the lines 2—2, 3—3 and 4—4, of Fig. 1.

Fig. 5 is a perspective view of the film receiving body member of the mount.

Referring now more particularly to the several views of the drawing, it will be apparent that the illustrated embodiment of the invention consists of a holder body 10 of composite construction in that the same consists of a receiving body member 11 and a retaining body member 12 which are of similar size and shape and are preferably made of sheet material such as cardboard of the desired thickness.

The receiving body member 11 is cut and formed to provide a plurality of display or sight openings 13 and depressions or recesses 14. Referring now to Fig. 5 it will be apparent that in some instances a depression or recess 14 surrounds a single opening 13 whereas, in other instances a depression or recess 14 surrounds more than one of the openings 13. It is also to be noted that each depression or recess extends to an edge of the body member 11 for a purpose to appear.

The retaining body member 12 is cut to provide display or sight openings 15 which are equal in number to the number of openings 13, and correspond in size and shape to the size and shape of the openings 13, so that when the members 11 and 12 are brought together the openings 13 and 15 will register with each other.

The members 11 and 12 are brought together and are held in any preferred manner such as by the use of metal clips, or by the use of glue. In the present instance the members 11 and 12 are glued together. When the members 11 and 12 are brought and held together the depressions 13 in the member 11 make provision for the insertion of negative films 16. Each of the films 16 can be inserted because of the fact that the depression or recess extends to an edge of the holder body formed, thus affording great facility in the mounting of the films for display purposes. By having more than one opening combined with one recess it is possible to display the registration on a single film in a segregated or separated condition. It is to be understood that one face of the holder body is adapted to have imprinted thereon certain indices connoting the subject matter of the films for the maintenance of a permanent record of each case.

I claim:

1. A film mount comprising two body members secured to each other, the body members having registering openings therein, one of said body members reduced in thickness to provide a depression surrounding its openings and extending to an edge of the body member in which it occurs, as and for the purpose specified.

2. A film mount comprising a film receiving body member, and a retaining body member, the receiving body member cut and formed to provide openings and a depression common to said openings, the retaining body member cut to provide openings corresponding in number to the number of openings in the receiving body member and registering therewith when said body members are brought together, and means for holding said body members together, the depressions adapting the film mount for the reception of films respectively, portions of which will be displayed respectively at the registering openings.

LESSER B. GROESCHEL.